Oct. 6, 1959  E. W. MOLLOHAN  2,907,163
ROTARY TYPE LAWN EDGER

Filed April 2, 1957  2 Sheets-Sheet 1

INVENTOR.
Eugene W. Mollohan
BY Victor J. Evans & Co.
ATTORNEYS

Oct. 6, 1959
E. W. MOLLOHAN
2,907,163
ROTARY TYPE LAWN EDGER
Filed April 2, 1957
2 Sheets-Sheet 2
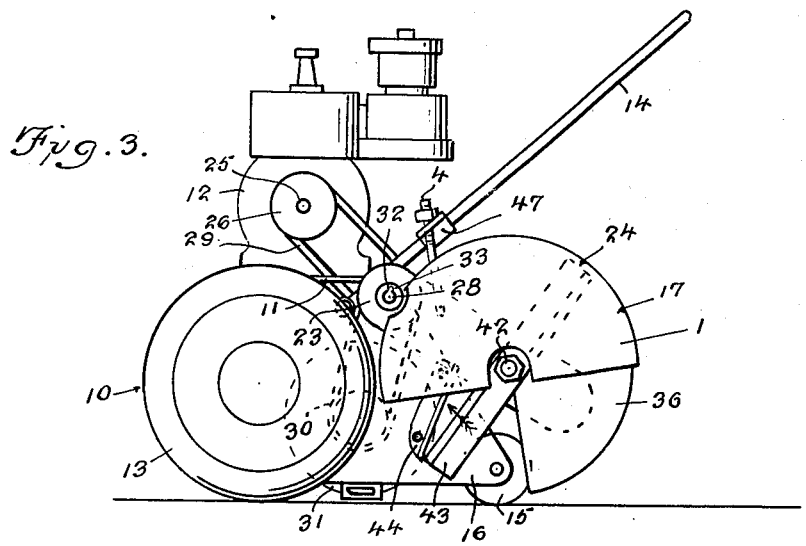
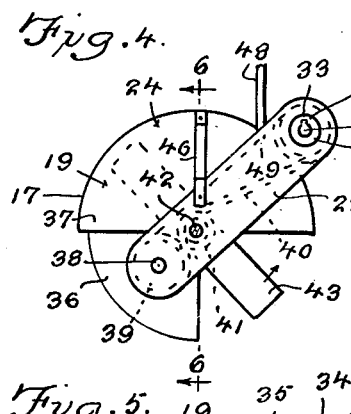
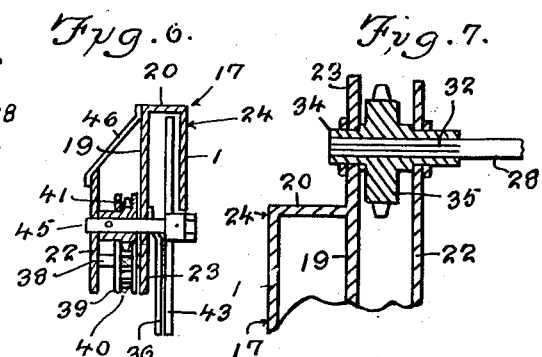
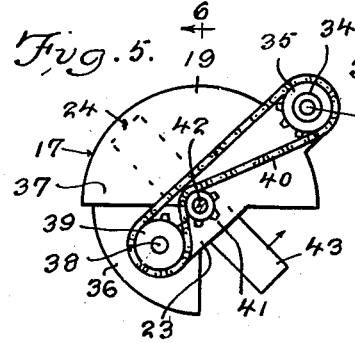
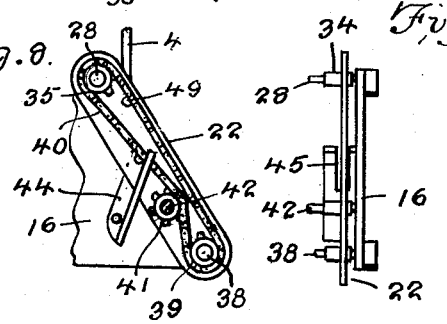
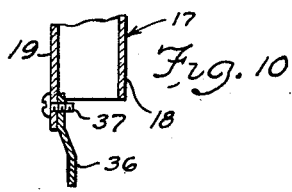
INVENTOR.
Eugene W. Mollohan
BY Victor J. Evans & Co.
ATTORNEYS United States Patent Office 2,907,163
Patented Oct. 6, 1959

2,907,163
ROTARY TYPE LAWN EDGER
Eugene W. Mollohan, Wichita, Kans.
Application April 2, 1957, Serial No. 650,186
2 Claims. (Cl. 56—25.4)

This invention relates to a lawn mower and more particularly to a rotary edger for a lawn mower, the edger providing a means for edging or trimming along driveways, walks, curbs, flower beds, and the like.

The object of the invention is to provide a rotary edger that can be readily attached to or detached from a lawn mower.

Another object of the invention is to provide a rotary edger for use with or attachment to a lawn mower, there being a means provided for driving or operating the edger, the edger including a blade which rotates in such a direction that the edger will operate at its maximum efficiency.

A further object of the invention is to provide a rotary type of lawn edger which is extremely simple and inexpensive to manufacture.

Other objects and advantages will be apparent during the course of the following description.

In the accompanying drawings, forming a part of this application, and in which like numerals are used to designate like parts throughout the same.

Figure 3 is a view similar to Figure 1, but showing the edger in raised or elevated position.

Figure 4 is a side elevational view showing the edger detached from the lawn mower.

Figure 5 is a view similar to Figure 4 but showing the chain drive for the rotary blade.

Figure 6 is a sectional view taken on the line 6—6 of Figure 4.

Figure 7 is an enlarged fragmentary sectional view illustrating a portion of the drive connection for the edger and showing a portion of the housing in section.

Figure 8 is a fragmentary elevational view illustrating the bracket fixed to the mower by which side play of the edger is eliminated.

Figure 9 is a view taken at right angles to the view shown in Figure 8.

Figure 10 is a fragmentary sectional view illustrating certain constructional details of the device.

Figure 1:
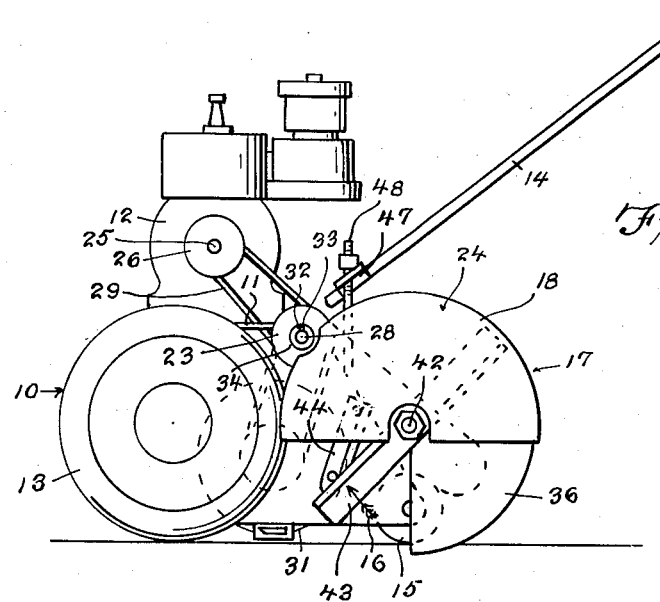
Figure 1 is a side elevational view illustrating the edger of the present invention connected to a lawn mower.

Referring in detail to the drawings, the numeral 10 designates a portion of a conventional lawn mower which includes a platform 11 that provides support for a power source such as an engine 12. The numeral 13 designates a pair of ground engaging wheels for the lawn mower, while the numeral 14 designates the rearwardly extending handle members and the numeral 15 designates the usual roller which may be journaled in side plates or wall members 16.

The present invention is directed to a rotary type edger which is indicated generally by the numeral 17, and the edger 17 can be quickly and easily attached to or detached from the lawn mower 10 as desired. The edger 17 includes a hollow housing 24 which consists of spaced parallel side walls or plates 18 and 19, and an arcuate top wall 20. Arranged within the housing 24 is a rotary blade or cutter 43, and spaced from the housing 24 is a bar 22, there being a shorter bar member 23 secured to or formed integral with the housing 24, Figure 7.

A means is provided for driving or operating the edger 17 as the engine or motor 12 is actuated, and this means comprises a first shaft 25 which is driven by the engine 12, there being a pulley 26 on the shaft 25. A second shaft 28 is provided on the lawn mower, and the shaft 28 has a pulley 27 mounted thereon, there being an endless belt 29 trained over the pulleys 26 and 27. A chain and sprocket mechanism 30 is connected to the shaft 28, and the chain and sprocket mechanism 30 serves to operate or rotate a reel 31 which functions in the usual manner, as on any conventional lawn mower.

There is further provided in the end of the shaft 28, a slot or keyway 32, and a sleeve 34 is detachably mounted on the shaft 28, the sleeve 34 being provided with a key 33 which is adapted to engage the slot 32 in the shaft 28 so that as the shaft 28 is rotated, the sleeve 34 will similarly be rotated. A sprocket 35 is formed integral with or secured to the sleeve 34, and the sprocket is interposed between the bar member 23 and the bar 22.

Secured to a wall of the housing 24 is a flange or skirt 36 and the flange 36 may be secured to the housing through the medium of suitable securing elements or bolt and nut assemblies 37. The flange 36 enters the earth or ground ¾ of an inch to 1 inch and serves as a guide against the concrete of a driveway, sidewalk, curb or flower bed and also prevents the blade 43 from striking concrete along which the edger may be operated. A shaft 38 is carried by the groundward end of the members 22 and 23, and a sprocket 39 is mounted on the shaft 38, there being an endless chain 40 trained around sprocket 39 and the sprocket 35. The chain 40 also extends over but not around the sprocket 41, Figure 5, and the sprocket member 41 is secured to a shaft 42, the shaft 42 being carried by members 22 and 23 on a line between sleeve 34 and shaft 38 but close to shaft 38, the shaft 42 being firmly connected to a rotating blade 43 which serves to perform the edging operation. Due to the arrangement of the chain 40 as shown in Figure 5, the blade 43 will rotate in a clockwise direction, Figure 3, so that the blade will operate with maximum efficiency. A guide member 44 is firmly fixed to the lawn mower frame and is provided with a slot 45 into which member 22 is lowered, thereby causing a fixed right angle allowing only up and down play in the edger as sleeve 34 is held at a fixed point by shaft 28 forming the top of the angle and member 22 forms the fixed side of the angle, and member 22 can move up and down but not sidewise. To remove the edger it is necessary only to raise member 22 out of slot 45 and slide sleeve 34 off of the shaft 28.

Figure 2:
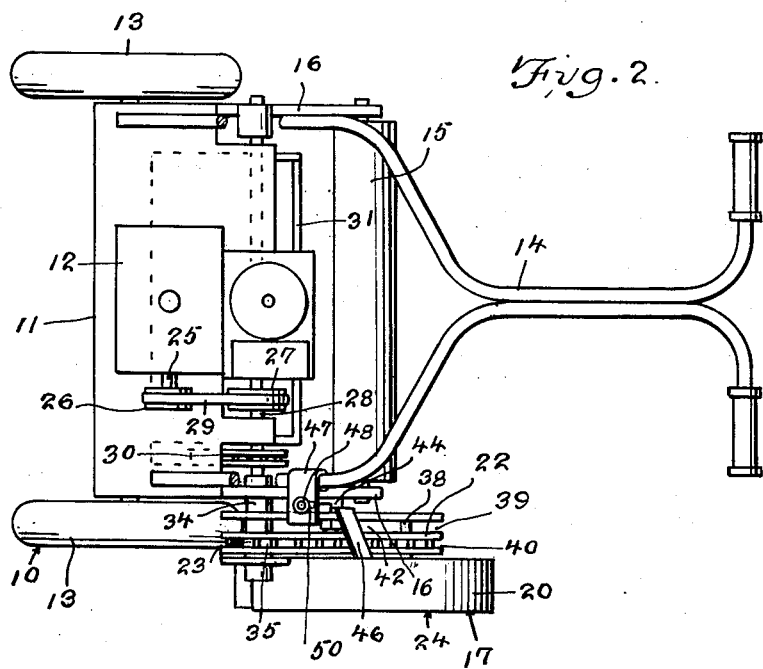
Figure 2 is a top plan view showing the edger connected to the lawn mower.

There is further provided a means for permitting the edger to be adjusted or raised as when the lawn mower is to be moved from place to place. This means comprises a rod 48 which extends through a bracket 47, the bracket 47 being connected to one of the handle members 14. The bracket 47 has a slot 50 into which rod 48 is placed. The rod 48 is held in slot 50 by gravity as rod 48 angles forward. When the edger is removed, the rod 48 is lifted out of the slot 50. The lower end of the rod 48 may be provided with a transverse finger 49 which engages a suitable opening in the bar 22, Figure 4. The handle members 14 can be used for raising the rod 48 so as to permit movement of the lawn mower with greater facility with the edger in raised position. A brace 46 is provided for helping to reinforce the various parts, Figure 2.

From the foregoing, it is apparent that there has been provided a lawn edger of the rotary type which is adapted to be used with or mounted on a lawn mower. In use, the motor or engine 12 can be actuated in the usual manner so as to rotate the shaft 25 and this causes movement of the endless belt 29. This in turn results in rotation of the shaft 28 which in turn drives the chain and sprocket mechanism 30 whereby the reel 31 of the lawn mower will be operated in the usual manner to cut the grass. When the rotary edger of the present invention is mounted on the lawn mower, this rotation of the shaft 28 will result in rotation of the sleeve 34 due to the provision of the intermeshing key 33 with the slot 32. As the sleeve 34 turns, it rotates the sprocket 35 which in turn moves the endless chain 40. As the chain 40 moves, it causes rotation of the sprocket members 39 and 41, the sprocket member 41 being mounted on the shaft 42, and the shaft 42 being connected to the rotary cutting blade 43. Thus, the blade 43 will rotate with the shaft 42 so that for example when the parts are in the lowered position shown in Figure 1, the rotary blade 43 will function as an edger and thereby cut the grass at the desired point. As previously described, the chain 40 is arranged over the sprocket member 41 as shown in Figure 5 so that the blade 43 rotates in a clockwise direction, Figures 1 and 3, whereby pebbles or the like will be prevented from being thrown rearwardly. The parts can be readily moved from the position shown in Figure 1 to the position shown in Figure 3 by raising the handle members 14, since this upward movement of the handle members 14 will raise the rod 48, the rod 48 being connected to the bracket 47 which is mounted on the handle members 14. As the rod 48 is raised, it lifts the edger since the transverse finger 49 of the rod 48 projects into the opening in the bar 22 of the edger, Figure 4.

Furthermore, when it is desired to remove the edger of the present invention from the lawn mower, it is only necessary to raise member 22 from slot 45, lift rod 48 from slot 50 and disengage the sleeve 34 from the shaft 28 and this can be done by sliding the sleeve 34 endwise off of the shaft 28. By doing this the edger is detached or by reversing the procedure the edger is attached, since there is no permanent connection between the lawn mower and the edger. Thus, with the edger removed the lawn mower can be used in the usual manner for any desired purpose.

The rotary edger of the present invention is a tool which is held by the motor chassis and which is operated by the mower motor 12. The edger or tool can be readily taken off or put back on with a minimum amount of effort and time.

As previously described, the blade 43 turns in a clockwise direction, Figures 1 and 3, so as to protect the operator from flying cuttings or pebbles. Also, by having the blade 43 rotated as previously described, the blade will follow its own path so as to drive up out of the ground instead of driving down through the ground. The shaft 28 is extended beyond the side of the lawn mower and this shaft rotates at all times when the motor 12 is operating. With the edger removed, the lawn mower operates in the usual manner. The shaft 28 has the slot 32 so that by aligning the key 33 in the sleeve 34 with the slot 32, the edger is readily aligned and locked in place and ready for use in a minimum amount of time. Due to the provision of the rod 48, when the handle members 14 are raised, the entire edger is raised above ground level to the position shown in Figure 3, for example, so that the lawn mower can be moved to a different location without the necessity of turning the motor off. By arranging the chain 40 as shown in Figure 5, the cutting blade 43 is made to turn in the proper direction.

Thus, if the blade rotated in the opposite direction and struck a pebble or other obstruction, it would have to drive it through the ground out behind toward the operator but with the present invention, the blade follows its own path and has very little resistance to turning movements. Also, cuttings, dirt or pebbles will be thrown out toward the front.

It is to be understood that certain modifications and minor changes can be made or are permissible without departing from the principle of the present invention.

It will be seen that there has been provided an edger in which the rotating blade turns in such a direction or manner that it will follow its own path which is the path of least resistance. Thus, the blade drives up out of the ground so that any solid obstacle which it encounters such as a pebble will be lifted out of the ground and will not be driven down into and through the ground.

The shaft 28 passes through the frame 16, and the sleeve 34 ends at the outside wall of the frame 16. The guide member 44 is secured to the frame 16, and the guide member 44 does not move when the handles 14 are raised.

What is claimed is:

1. In combination with a lawn mower of the type including a horizontally disposed platform, rearwardly extending handle members, a power source supported on said platform, spaced parallel ground engaging wheels operatively connected to said power source, said lawn mower further including a pair of spaced parallel vertically disposed plates, a ground engaging roller extending between said pair of plates; the improvements consisting in providing a rotary edger which comprises a hollow housing embodying a curved top wall and first and second side walls, a blade rotatably mounted in said housing, a first shaft driven by said power source, a second shaft arranged in spaced parallel relation with respect to said first shaft, belt and pulley means connecting said first and second shafts together, said second shaft being provided with a keyway adjacent an end thereof, a sleeve detachably mounted on said second shaft and having a key engaging said keyway, a sprocket mounted on said sleeve, bar members arranged on opposite sides of said sprocket, a third shaft extending between said bar members, said third shaft having a sprocket mounted thereon, a fourth shaft extending between said bar members and into said housing and connected to said rotary blade and having a sprocket on this shaft also, an endless chain trained around said sprockets and extending over said last sprocket member, a bracket arranged in engagement with one of said handle members, and a rod extending down through said bracket and having its lower end connected to one of the bar members.

2. The structure as defined in claim 1 wherein the blade revolves in the same direction the lawn mower is moving so that as any debris in the soil is lifted up, it will be thrown out and away from the operator.

References Cited in the file of this patent

UNITED STATES PATENTS

| | | |
|---|---|---|
| 2,514,593 | Velotta | July 11, 1950 |
| 2,682,825 | Warholoski | July 6, 1954 |
| 2,734,330 | Pilkington | Feb. 14, 1956 |
| 2,775,856 | Hoch | Jan. 1, 1957 |
| 2,795,915 | Miller | June 18, 1957 |
| 2,829,482 | Wadsworth | Apr. 8, 1958 |